United States Patent
Richardson et al.

(10) Patent No.: US 12,516,605 B1
(45) Date of Patent: Jan. 6, 2026

(54) IN SITU BALANCING MASS(ES) FOR AIRCRAFT POWERPLANT

(71) Applicant: Pratt & Whitney Canada Corp., Longueuil (CA)

(72) Inventors: Tyler Richardson, Toronto (CA); Nathan Tomes, Hamilton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/960,316

(22) Filed: Nov. 26, 2024

(51) Int. Cl.
*F01D 5/02* (2006.01)
*F04D 29/66* (2006.01)

(52) U.S. Cl.
CPC .......... *F01D 5/027* (2013.01); *F04D 29/662* (2013.01); *F05D 2220/323* (2013.01)

(58) Field of Classification Search
CPC ......... F01D 5/027; F04D 29/662; F16F 15/32
See application file for complete search history.

(56) References Cited

U.S. PATENT DOCUMENTS

| | | | | |
|---|---|---|---|---|
| 4,926,710 A | * | 5/1990 | Novotny | F16F 15/34 29/889.7 |
| 6,588,298 B2 | * | 7/2003 | Czerniak | F01D 5/027 73/470 |
| 7,296,976 B2 | | 11/2007 | Roever | |
| 10,989,054 B2 | * | 4/2021 | Himes | F04D 29/321 |
| 11,480,071 B2 | * | 10/2022 | Pellerin | F01D 25/164 |

* cited by examiner

*Primary Examiner* — Christopher R Legendre
(74) *Attorney, Agent, or Firm* — Getz Balich LLC

(57) ABSTRACT

A rotating structure for an aircraft powerplant includes a shaft, a retainer, a balancing device and a bladed rotor. The shaft includes a bore and a shoulder axially along the bore. The retainer is disposed in the bore and mounted to the shaft. The balancing device is configured to rotationally balance the rotating structure about the axis. The balancing device is disposed in the bore and axially retained between the shoulder and the retainer. The balancing device includes a balancing mass with a plurality of mass teeth arranged circumferentially about the axis. During a first condition, the balancing mass is rotationally repositionable about the axis relative to the shaft while the balancing device remains in the bore and axially retained between the shoulder and the retainer. During a second condition, the mass teeth are meshed with a plurality of shaft teeth to rotationally fixed the balancing mass to the shaft.

20 Claims, 12 Drawing Sheets

IN SITU BALANCING MASS(ES) FOR
AIRCRAFT POWERPLANT

TECHNICAL FIELD

This disclosure relates generally to an aircraft powerplant and, more particularly, to systems and methods for rotationally balancing a rotating structure of the aircraft powerplant.

BACKGROUND INFORMATION

Various systems and methods are known in the art for rotationally balancing a rotating structure of an aircraft powerplant such as a gas turbine engine. While these known balancing systems and methods have various benefits, there is still room in the art for improvement.

SUMMARY

According to an aspect of the present disclosure, an apparatus is provided for an aircraft powerplant. This apparatus includes a rotating structure configured to rotate about an axis. The rotating structure includes a shaft, a retainer, a balancing device and a bladed rotor connected to the shaft. The shaft includes a bore and a shoulder axially along the bore. The retainer is disposed in the bore and mounted to the shaft. The balancing device is configured to rotationally balance the rotating structure about the axis. The balancing device is disposed in the bore and axially retained between the shoulder and the retainer. The balancing device includes a balancing mass with a plurality of mass teeth arranged circumferentially about the axis. During a first condition, the balancing mass is rotationally repositionable about the axis relative to the shaft while the balancing device remains in the bore and axially retained between the shoulder and the retainer. During a second condition, the mass teeth are meshed with a plurality of shaft teeth of the shaft to rotationally fixed the balancing mass to the shaft.

According to another aspect of the present disclosure, another apparatus is provided for an aircraft powerplant. This apparatus includes a rotating structure configured to rotate about an axis. The rotating structure includes a shaft, a retainer, a balancing device and a bladed rotor connected to the shaft. The shaft includes a bore, a plurality of shaft teeth and a shoulder axially along the bore. The retainer is disposed in the bore and mounted to the shaft. The balancing device is configured to rotationally balance the rotating structure about the axis. The balancing device is disposed in the bore and axially retained between the shoulder and the retainer. The balancing device includes a balancing mass. The balancing mass includes a mass ring, a mass weight and a plurality of mass teeth. The mass ring extends circumferentially about the axis between opposing circumferential ends of the balancing mass. The mass weight projects radially inward from the mass ring. The mass teeth are arranged circumferentially about the axis and project radially out from the mass ring. The mass teeth are meshed with the shaft teeth.

According to still another aspect of the present disclosure, another apparatus is provided for an aircraft powerplant. This apparatus includes a rotating structure configured to rotate about an axis. The rotating structure includes a shaft, a retainer, a balancing device and a bladed rotor connected to the shaft. The shaft includes a bore and a shoulder with a plurality of shaft teeth. The retainer is disposed in the bore and mounted to the shaft. The balancing device is configured to rotationally balance the rotating structure about the axis. The balancing device is disposed in the bore and axially retained between the shoulder and the retainer. The balancing device includes a balancing mass and a spring element that is located axially between and engaged with the balancing mass and the retainer. The balancing mass includes a mass ring, a mass weight and a plurality of mass teeth. The mass ring extends circumferentially around the axis. The mass weight projects radially inward from the mass ring. The mass teeth are arranged circumferentially about the axis and project axially out from the mass ring. The mass teeth are meshed with the shaft teeth.

The balancing mass may be rotationally repositionable about the axis relative to the shaft while the balancing device remains in the bore and axially retained between the shoulder and the retainer.

The balancing mass may be a first balancing mass. The balancing device may also include a second balancing mass. The second balancing mass may include a second mass ring, a second mass weight and a plurality of second mass teeth. The second mass ring may extend circumferentially about the axis between opposing circumferential ends of the second balancing mass. The second mass weight may project radially inward from the second mass ring. The second mass teeth may be arranged circumferentially about the axis and project radially out from the second mass ring. The second mass teeth may be meshed with the shaft teeth.

The balancing device may also include a third balancing mass. The first balancing mass, the second balancing mass and the third balancing may be arranged in a stack axially between the shoulder and the retainer. The third balancing mass may include a third mass ring, a third mass weight and a plurality of third mass teeth. The third mass ring may extend circumferentially about the axis between opposing circumferential ends of the third balancing mass. The third mass weight may project radially inward from the third mass ring. The third mass teeth may be arranged circumferentially about the axis and project radially out from the third mass ring. The third mass teeth may be meshed with the shaft teeth.

The balancing mass may also include a mass ring extending circumferentially about the axis. Each of the mass teeth may be connected to and project out from the mass ring.

The balancing mass may also include a mass weight connected to the mass ring. The mass weight may project radially inward from the mass ring.

The mass teeth may project out from the mass ring in a radial outward direction away from the axis.

The mass teeth may project out from the mass ring in an axial direction along the axis.

The mass ring may extend circumferentially about the axis between opposing circumferential ends of the mass ring. The mass ring may include a slot formed by and circumferentially between the opposing circumferential ends of the mass ring.

The mass ring may have a full-hoop geometry around the axis.

The balancing mass may be elastically deformable between a first configuration and a second configuration such that that a radius of the balancing mass in the first configuration is smaller than the radius of the balancing mass in the second configuration. The balancing mass may be in the first configuration during the first condition. The balancing mass may be in the second configuration during the second condition.

The balancing mass may axially engage the retainer.

The balancing mass may be a first balancing mass. The balancing device may also include a second balancing mass axially engaged with the first balancing mass.

The balancing device may also include a third balancing mass axially engaged with the first balancing mass. The first balancing mass may be axially between the second balancing mass and the third balancing mass.

The balancing device may also include a spring element axially between the balancing mass and the retainer.

The spring element may be axially engaged with the balancing mass and the retainer.

The spring element may be elastically deformable between a first configuration and a second configuration such that an axial thickness of the spring element in the first configuration is smaller than the axial thickness of the spring element in the second configuration. The spring element may be in the first configuration during the first condition. The spring element may be in the second configuration during the second condition.

The apparatus may also include a compressor section, a combustor section, a turbine section and a flowpath extending through the compressor section, the combustor section and the turbine section. The bladed rotor may be disposed in the turbine section or the compressor section.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
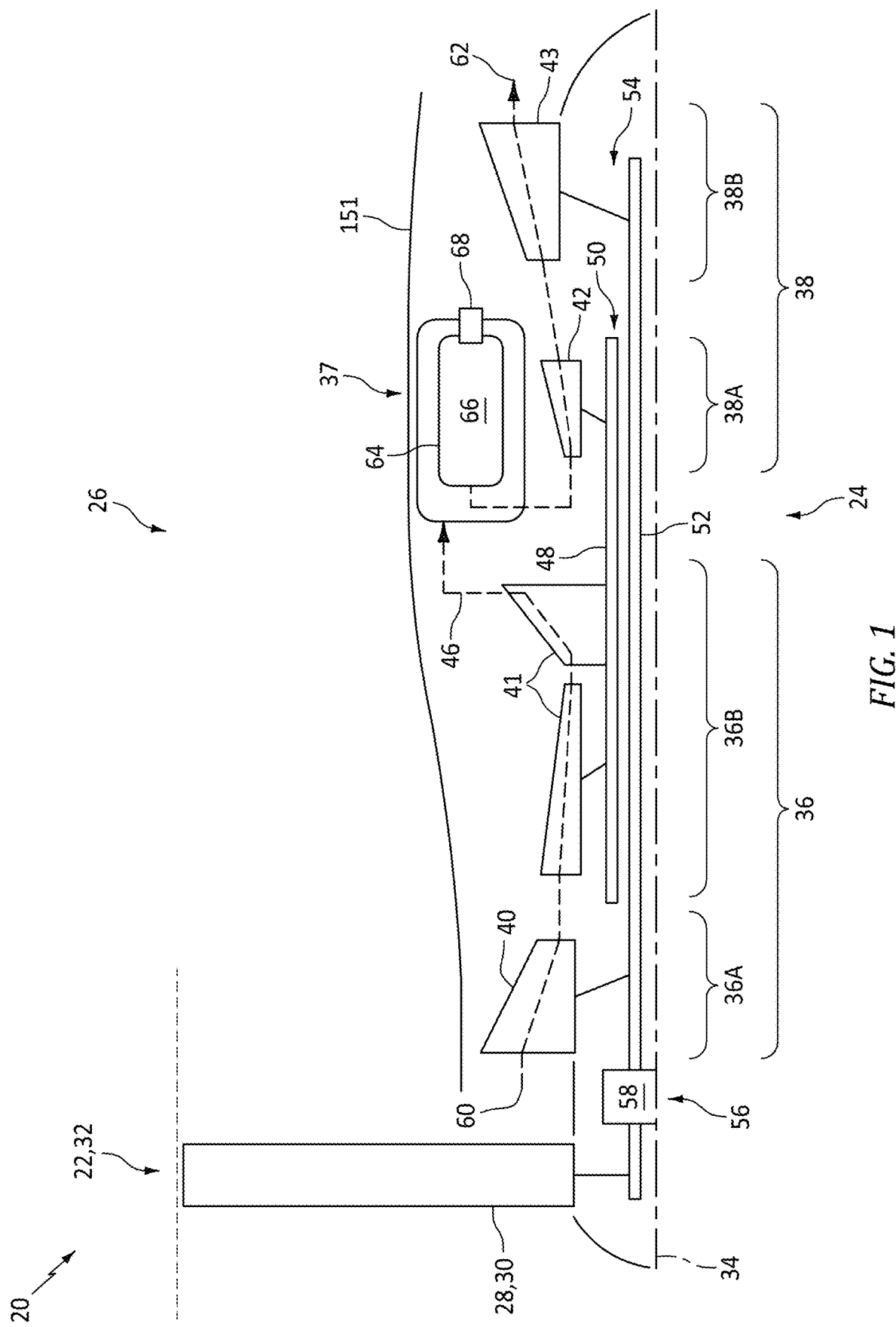
FIG. 1 is a partial schematic sectional illustration of an aircraft powerplant.

FIG. 1 illustrates a powerplant 20 for an aircraft. The aircraft may be an airplane, a rotorcraft (e.g., a helicopter), a drone (e.g., an unmanned aerial vehicle (UAV)) or any other manned or unmanned aerial vehicle or system. The aircraft powerplant 20 may be configured as, or otherwise included as part of, a propulsion system for the aircraft. The aircraft powerplant 20 may also or alternatively be configured as, or otherwise included as part of, an electrical power system for the aircraft. The aircraft powerplant 20 of FIG. 1 includes a mechanical load 22 and a core 24 of a gas turbine engine 26, where the engine core 24 (e.g., a gas generator) is configured to power operation of the mechanical load 22.

The mechanical load 22 may be configured as or otherwise include a rotor 28 mechanically driven by the engine core 24. This driven rotor 28 may be a bladed propulsor rotor 30 for the aircraft propulsion system. The propulsor rotor 30 may be a ducted propulsor rotor, an open propulsor rotor (e.g., an un-ducted propulsor rotor) or any other type of air moving rotor. For example, where the gas turbine engine 26 is a turbofan engine, the ducted propulsor rotor may be a fan rotor. Where the gas turbine engine 26 is a turboprop engine, the open propulsor rotor may be a propeller rotor. Where the gas turbine engine 26 is a turboshaft engine, the open propulsor rotor may be a rotorcraft rotor such as a helicopter main rotor or a helicopter tail rotor. Alternatively, the driven rotor 28 may be configured as a generator rotor of an electric power generator for the aircraft electrical power system; e.g., an auxiliary power unit (APU) system. The present disclosure, however, is not limited to the foregoing exemplary mechanical loads nor to the foregoing exemplary gas turbine engines. The gas turbine engine 26, for example, may alternatively be configured as a turbojet engine, a propfan engine, a pusher fan engine or any other type of gas turbine engine 26 operable to power the operation of the mechanical load 22. However, for ease of description, the mechanical load 22 is described below as a propulsor section 32 of the gas turbine engine 26, and the driven rotor 28 is described below as the propulsor rotor 30 within the propulsor section 32.

The gas turbine engine 26 extends axially along an axis 34 from a forward, upstream end of the gas turbine engine 26 to an aft, downstream end of the gas turbine engine 26. Briefly, this powerplant axis 34 may be a centerline axis of the gas turbine engine 26 and/or its members. The powerplant axis 34 may also be a rotational axis of one or more members of the gas turbine engine 26. The gas turbine engine 26 of FIG. 1 includes the propulsor section 32, a compressor section 36, a combustor section 37 and a turbine section 38. The compressor section 36 of FIG. 1 includes a low pressure compressor (LPC) section 36A and a high pressure compressor (HPC) section 36B. The turbine section 38 of FIG. 1 includes a high pressure turbine (HPT) section 38A and a low pressure turbine (LPT) section 38B.

The LPC section 36A includes a low pressure compressor (LPC) rotor 40. The HPC section 36B includes a high pressure compressor (HPC) rotor 41. The HPT section 38A includes a high pressure turbine (HPT) rotor 42. The LPT section 38B includes a low pressure turbine (LPT) rotor 43. The LPC rotor 40, the HPC rotor 41, the HPT rotor 42 and the LPT rotor 43 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages longitudinally along an (e.g., annular) internal flowpath 46 of the gas turbine engine 26 and its engine core 24. Each of the rotor blades is connected to the respective rotor base. Each of the rotor blades projects radially (e.g., spanwise) out from the respective rotor base into the engine flowpath 46 and to a distal tip of the respective rotor blade.

The HPC rotor 41 is coupled to and rotatable with the HPT rotor 42. The HPC rotor 41 of FIG. 1, for example, is connected to the HPT rotor 42 by a high speed shaft 48. At least (or only) the HPC rotor 41, the HPT rotor 42 and the high speed shaft 48 collectively form a high speed rotating structure 50; e.g., a high speed spool of the engine core 24. This high speed rotating structure 50 may be rotatable about the powerplant axis 34.

The LPC rotor 40 is coupled to and rotatable with the LPT rotor 43. The LPC rotor 40 of FIG. 1, for example, is connected to the LPT rotor 43 by a low speed shaft 52. At least (or only) the LPC rotor 40, the LPT rotor 43 and the low speed shaft 52 collectively form a low speed rotating structure 54; e.g., a low speed spool of the engine core 24. This low speed rotating structure 54 is further coupled to the propulsor rotor 30—the driven rotor 28—through a drivetrain 56. This drivetrain 56 may be configured as a geared drivetrain, where a geartrain 58 (e.g., a transmission, a speed change device, an epicyclic geartrain, etc.) is disposed between and operatively couples the propulsor rotor 30 to the low speed rotating structure 54 and its LPT rotor 43. With this arrangement, the propulsor rotor 30 may rotate at a different (e.g., slower) rotational speed than the low speed rotating structure 54 and its LPT rotor 43. However, the drivetrain 56 may alternatively be configured as a direct-drive drivetrain, where the geartrain 58 is omitted. With such an arrangement, the propulsor rotor 30 rotates at a common (the same) rotational speed as the low speed rotating structure 54 and its LPT rotor 43. This low speed rotating structure 54 and/or the propulsor rotor 30 may be rotatable about the powerplant axis 34. Alternatively, the propulsor rotor 30 may be offset from the engine core 24 such that the propulsor rotor 30 rotates about an axis which is (e.g., laterally and/or axially) offset from the powerplant axis 34.

The engine flowpath 46 (e.g., a core flowpath) extends longitudinally within the gas turbine engine 26 and its engine core 24 from an airflow inlet 60 into the engine flowpath 46 to a combustion products exhaust 62 from the engine flowpath 46. The engine flowpath 46 of FIG. 1, for example, extends sequentially longitudinally through the LPC section 36A, the HPC section 36B, the combustor section 37, the HPT section 38A and the LPT section 38B, from the flowpath inlet 60 to the flowpath exhaust 62. With this arrangement, the engine flowpath 46 extends sequentially longitudinally across the LPC rotor 40, the HPC rotor 41, a (e.g., annular) combustor 64 within the combustor section 37, the HPT rotor 42 and the LPT rotor 43 between the flowpath inlet 60 and the flowpath exhaust 62.

During operation of the aircraft powerplant 20, ambient air may be directed across the propulsor rotor 30 (e.g., the fan rotor, the propeller rotor, etc.) and into the engine core 24 through the flowpath inlet 60. This air entering the engine flowpath 46 may be referred to as "core air". The core air is compressed by the LPC rotor 40 and the HPC rotor 41 and directed into a (e.g., annular) combustion chamber 66 within the combustor 64. Fuel is introduced into the engine flowpath 46 by one or more fuel injectors 68. This fuel is mixed with the compressed core air to provide a fuel-air mixture. The fuel-air mixture is ignited and combustion products thereof flow through and sequentially drive rotation of the HPT rotor 42 and the LPT rotor 43. The rotation of the HPT rotor 42 and the LPT rotor 43 respectively drive rotation of the LPC rotor 40 and the HPC rotor 41 and, thus, the compression of the air received from the flowpath inlet 60. The rotation of the LPT rotor 43 drives rotation of the propulsor rotor 30—the driven rotor 28. The rotation of the propulsor rotor 30 propels some of the air flow thereacross (e.g., the air not entering the engine core 24) outside of the engine core 24 to provide engine thrust. Of course, where the driven rotor 28 is alternatively configured as the generator rotor, the rotation of this generator rotor may facilitate generation of electricity.

While the aircraft powerplant 20 and its gas turbine engine 26 are described above with a particular two rotating structure arrangement, the present disclosure is not limited thereto. For example, the LPC rotor 40 may be omitted to configure the LPT rotor 43 as a power turbine (PT) rotor. In another example, the aircraft powerplant 20 and its gas turbine engine 26 may also include another rotating structure; e.g., an intermediate speed spool of the engine core 24. In still another example, the high speed rotating structure 50 may be omitted to provide the gas turbine engine 26 with a single rotating structure arrangement.

Figure 2:
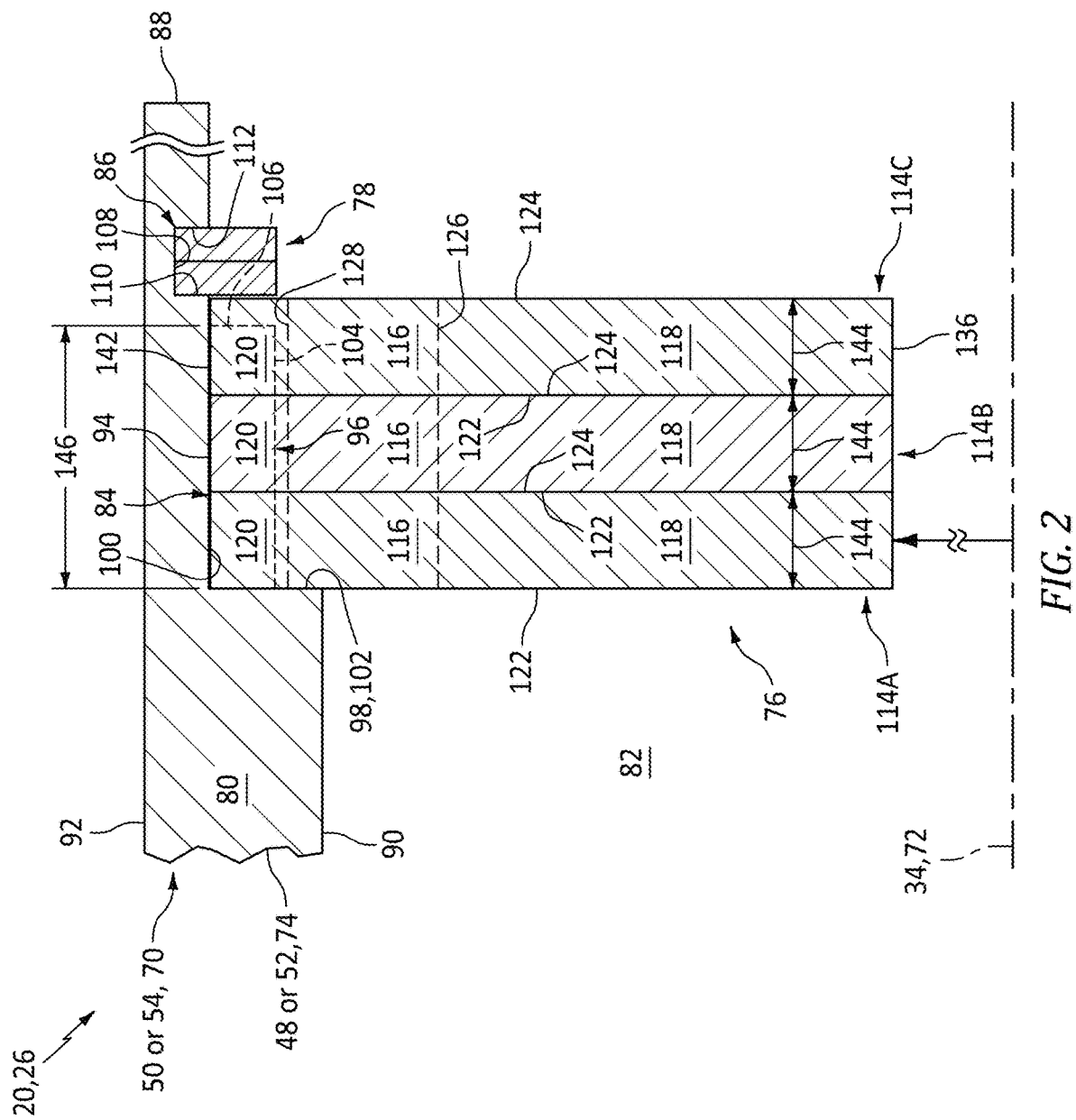
FIG. 2 is a partial sectional illustration of a powerplant rotating structure.

FIG. 2 illustrates a portion of a powerplant rotating structure 70 along an axis 72 such as the powerplant axis 34 (or another rotational axis). This powerplant rotating structure 70 may be configured as the high speed rotating structure 50, the low speed rotating structure 54 or another rotating structure within the aircraft powerplant 20 and its gas turbine engine 26. The powerplant rotating structure 70 is rotatable about the structure axis 72. The powerplant rotating structure 70 of FIG. 2 includes a powerplant shaft 74 (e.g., the high speed shaft 48, the low speed shaft 52, etc.), a rotating structure balancing device 76 and a retainer 78; e.g., a retaining ring, a clip, a split ring, etc. The powerplant rotating structure 70, of course, may also include one or more additional powerplant components other than those shown in FIG. 2. For example, where the powerplant rotating structure 70 is configured as one of the rotating structures 50, 54, the powerplant rotating structure 70 also includes one or more engine rotors (e.g., 40 and 43, 41 and 42 as shown in FIG. 1).

The powerplant shaft 74 includes a shaft sidewall 80, an internal shaft bore 82, a mass receptacle 84 and a retainer receptacle 86. The powerplant shaft 74 and its shaft sidewall 80 extend axially along the structure axis 72 to an axial distal end 88 of the powerplant shaft 74. The powerplant shaft 74 and its shaft sidewall 80 extend radially from a radial inner side 90 of the powerplant shaft 74 to a radial outer side 92 of the powerplant shaft 74. The powerplant shaft 74 and its shaft sidewall 80 extend circumferentially around the structure axis 72 providing the powerplant shaft 74 and its shaft sidewall 80 with a full-hoop (e.g., tubular) geometry. With this arrangement, the shaft sidewall 80 forms a radial outer peripheral boundary of the shaft bore 82 at the shaft inner side 90.

The mass receptacle 84 of FIG. 2 includes a receptacle aperture 94 (e.g., a recess, a notch, a channel, etc.) and a plurality of shaft teeth 96; e.g., splines. The receptacle aperture 94 projects partially axially into the powerplant shaft 74 and its shaft sidewall 80 to an axial distal end 98 of the mass receptacle 84, for example from the shaft end 88. The receptacle aperture 94 projects partially radially into the powerplant shaft 74 in a radial outward direction (away from the structure axis 72) from the shaft inner side 90 to a radial outer side 100 of the mass receptacle 84. The receptacle end 98 of FIG. 2 is formed by an annular shoulder 102 of the powerplant shaft 74. This shaft shoulder 102 extends radially between and may be contiguous with a surface of the powerplant shaft 74 at the shaft inner side 90 and a surface of the powerplant shaft 74 at the receptacle outer side 100. The shaft shoulder 102 may be defined by a flat, planar annular surface which is perpendicular to the structure axis 72.

Figure 3:
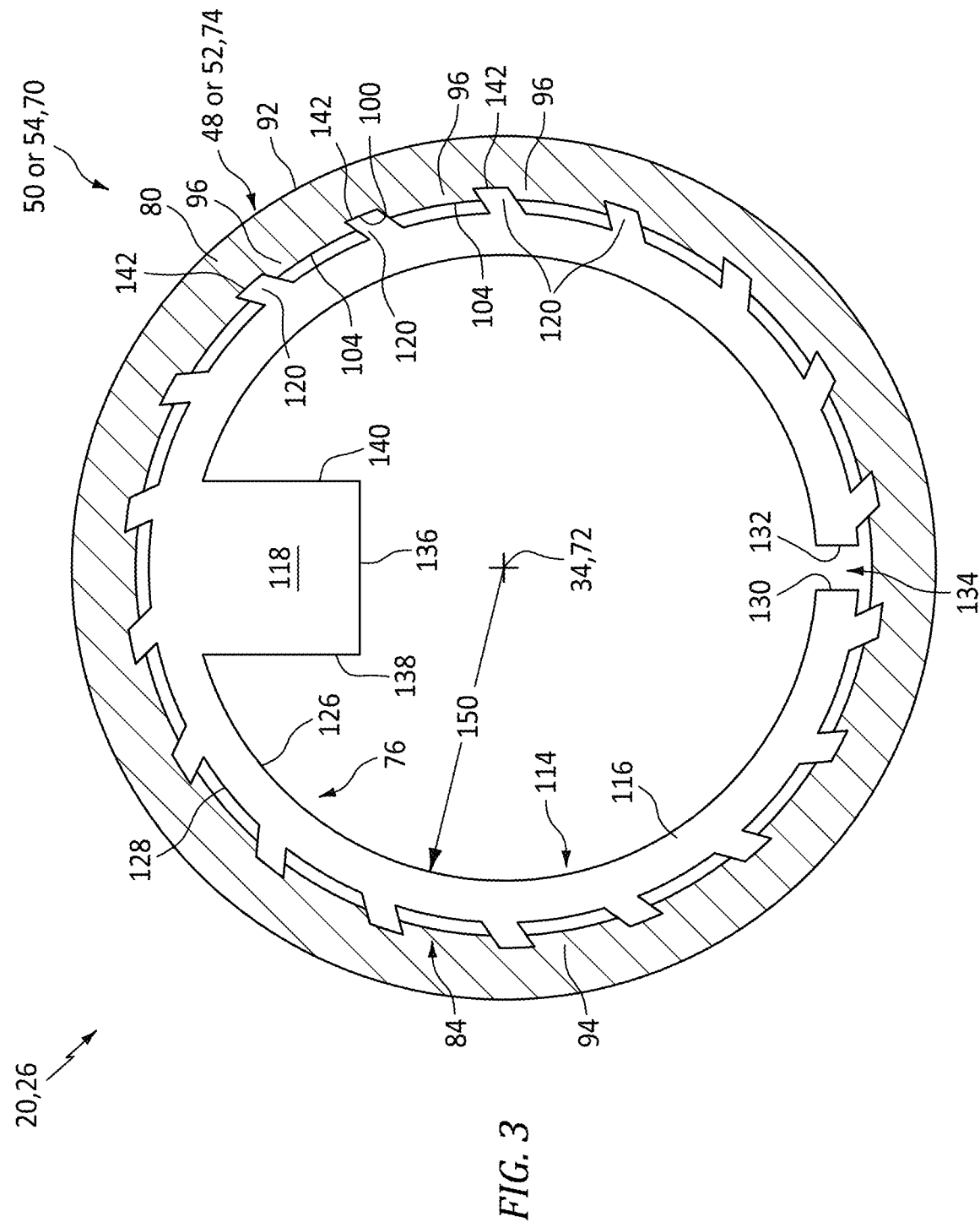
FIG. 3 is a cross-sectional illustration of the powerplant rotating structure.
Figure 4:
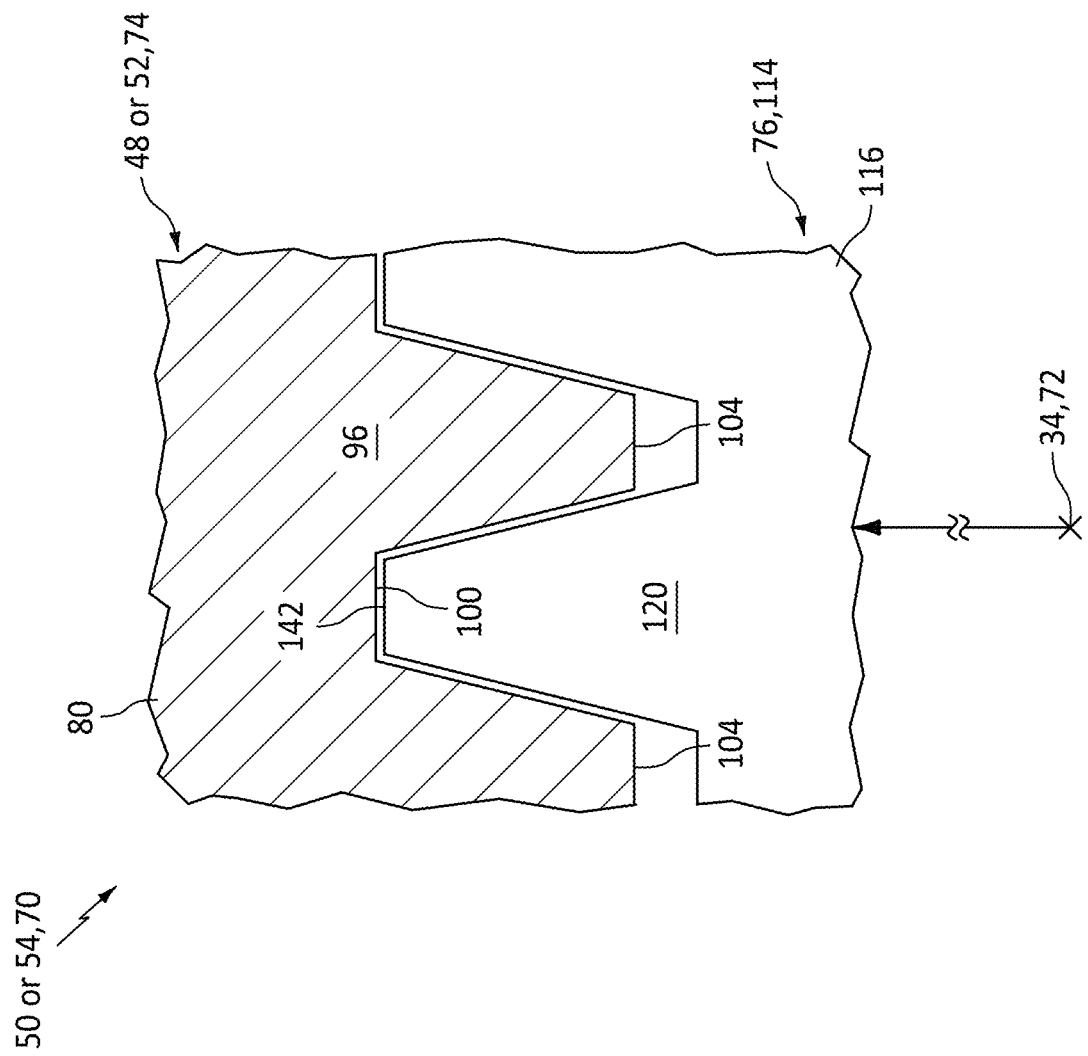
FIG. 4 is a cross-sectional illustration of a portion of the powerplant rotating structure with another meshed interface arrangement.

Referring to FIG. 3, the shaft teeth 96 are arranged and are equispaced circumferentially about the structure axis 72 in an annular array; e.g., a circular array. Each of the shaft teeth 96 is connected to (e.g., formed integral with or otherwise attached to) the shaft sidewall 80. Each of the shaft teeth 96 projects radially in a radial inward direction (towards the structure axis 72) from the shaft sidewall 80 at the receptacle outer side 100 to a tip 104 (e.g., a radial inner distal end) of the respective shaft tooth 96. Referring to FIG. 2, each of the shaft teeth 96 projects axially along the shaft sidewall 80 at the receptacle outer side 100 out from the receptacle end 98/the shaft shoulder 102 to an axial distal end 106 of the respective shaft tooth 96. Referring again to FIG. 3, each of the shaft teeth 96 may be canted (e.g., tilted, angled, etc.) a common first circumferential direction about the structure axis 72 as the respective shaft tooth 96 projects radially inward to its respective shaft tooth tip 104. Each shaft tooth 96 may thereby be configured with an asymmetric geometry when viewed, for example, in a reference plane perpendicular to the structure axis 72. In other embodiments however, referring to FIG. 4, each shaft tooth 96 may alternatively be configured with a symmetric geometry when viewed, for example, in the reference plane.

Referring to FIG. 2, the retainer receptacle 86 projects partially radially into the powerplant shaft 74 and its shaft sidewall 80 from the receptacle outer side 100 to a radial distal end 108 of the retainer receptacle 86. The retainer receptacle 86 extends axially within the powerplant shaft 74 and its shaft sidewall 80 between opposing axial sides 110 and 112 of the retainer receptacle 86. The retainer receptacle 86 extends circumferentially around the structure axis 72 providing the retainer receptacle 86 with a full-hoop (e.g., annular) geometry.

The balancing device 76 is configured to rotationally balance the powerplant rotating structure 70 about the structure axis 72 while, for example, the powerplant rotating structure 70 remains partially or completely installed within the aircraft powerplant 20 and its gas turbine engine 26. The balancing device 76 of FIG. 2 includes a set of one or more balancing masses 114A-C (generally referred to as "114"). In the specific embodiment of FIG. 2, the balancing device 76 is provided with three (3) of the balancing masses 114 in order, for example, to facilitate partial or complete cancellation of local moments exerted by the balancing masses 114 on the rest of the powerplant rotating structure 70. However, in other embodiments, it is contemplated the balancing device 76 may alternatively include a single balancing mass, a pair of balancing masses, or more than three balancing masses, particularly where the powerplant rotating structure 70 is configured with multiple balancing devices located at different axial locations along the powerplant shaft 74.

Each balancing mass 114 includes a mass ring 116, a mass weight 118 and a plurality of mass teeth 120 (see also FIG. 3). Each balancing mass 114 and its members 116, 118 and 120 extend axially along the structure axis 72 between opposing axial ends 122 and 124 of the respective balancing mass 114.

Referring to FIG. 3, the mass ring 116 extends radially from a radial inner side 126 of the mass ring 116 to a radial outer side 128 of the mass ring 116. The mass ring 116 extends circumferentially about (e.g., partially around) the structure axis 72 between opposing circumferential ends 130 and 132 of the balancing mass 114 and its mass ring 116. Here, the mass ring 116 and, more generally, the respective balancing mass 114 may extend at least or more than three-hundred and forty degrees (≥340°) and less than three-hundred and sixty degrees (<360°) about the structure axis 72 between the mass ends 130 and 132. With this arrangement, each balancing mass 114 and its mass ring 116 may have a piston-ring type configuration. Each balancing mass 114 of FIG. 3 and its mass ring 116, for example, are configured with a mass slot 134 formed by and circumferentially between the mass ends 130 and 132. This mass slot 134 extends radially through the balancing mass 114 and its mass ring 116. The mass slot 134 extends axially through the balancing mass 114 and its mass ring 116. The mass slot 134 thereby completely physically separates a first end portion of the balancing mass 114 and its mass ring 116 at the first mass end 130 from a second end portion of the balancing mass 114 and its mass ring 116 at the second mass end 132. However, in other embodiments, it is contemplated the balancing mass 114 and its mass ring 116 may alternatively have a full-hoop body without the mass slot 134, particularly where the mass teeth 120 are flexible, resilient members of the balancing mass 114 for example.

The mass weight 118 is connected to (e.g., formed integral with or otherwise attached to) the mass ring 116. The mass weight 118 may be located at the ring inner side 126. The mass weight 118 of FIG. 3, for example, projects in the radial inward direction from the mass ring 116 at its ring inner side 126 to a radial inner distal end 136 of the mass weight 118. The mass weight 118 extends laterally (e.g., circumferentially or tangentially) between opposing lateral sides 138 and 140 of the mass weight 118. This mass weight 118 is configured to provide the respective balancing mass 114 with an eccentric center of mass about the structure axis 72. The mass weight 118 may be located at an intermediate (e.g., midpoint) position between circumferentially between the opposing mass ends 130 and 132. The mass weight 118 of FIG. 3, for example, is arranged diametrically opposite the mass slot 134. The present disclosure, however, is not limited to such an exemplary arrangement. For example, in other embodiments, the mass weight 118 may be positioned at or other circumferentially closer to one of the mass ends 130 and 132.

The mass teeth 120 are arranged and are equispaced circumferentially about the structure axis 72 in an annular array; e.g., a circular array. Each of the mass teeth 120 is connected to (e.g., formed integral with or otherwise attached to) the mass ring 116. Each of the mass teeth 120 projects radially in the radial outward direction from the mass ring 116 at the ring outer side 128 to a tip 142 (e.g., a radial outer distal end) of the respective mass tooth 120. Referring to FIG. 2, each mass tooth 120 has an axial width 144 that is sized less than an axial length 146 of each shaft tooth 96. The shaft tooth length 146 of FIG. 2, for example, is between two and one-half times (2.5×) and three times (3×) the mass tooth thickness 144, inclusive. Of course, the foregoing shaft tooth length 146 may change depending on the number of the balancing masses 114 included in the balancing device 76. Referring again to FIG. 3, each of the mass teeth 120 may be canted (e.g., tilted, angled, etc.) a common second circumferential direction about the structure axis 72 as the respective mass tooth 120 projects radially outward to its respective mass tooth tip 142, which second circumferential direction is opposite the first circumferential direction. Each mass tooth 120 may thereby be configured with an asymmetric geometry when viewed, for example, in a reference plane perpendicular to the structure axis 72. Here, a configuration of each mass tooth 120 may be substantially a mirror image of a configuration of each shaft tooth 96. In other embodiments however, referring to FIG. 4, each mass tooth 120 may alternatively be configured with a symmetric geometry when viewed, for example, in the reference plane.

Referring to FIG. 2, the balancing device 76 and its balancing masses 114 are disposed within the shaft bore 82 and mounted to the powerplant shaft 74. The balancing device 76 of FIG. 2 and its balancing masses 114, for example, are axially captured between the shaft shoulder 102 and the retainer 78, where the retainer 78 is seated in the retainer receptacle 86. With this arrangement, the balancing masses 114 are in a stack-up between the shaft shoulder 102 and the retainer 78. The first balancing mass 114A is axially between and may axially engage (e.g., contact, abut against, etc.) the shaft shoulder 102 and the second balancing mass 114B. The second balancing mass 114B is axially between and may axially engage (e.g., contact, abut against, etc.) the first balancing mass 114A and the third balancing mass 114C. The third balancing mass 114C is axially between and may axially engage (e.g., contact, abut against, etc.) the second balancing mass 114B and the retainer 78. Referring to FIG. 3, each balancing mass 114 also engages the powerplant shaft 74 through a respective radial meshed interface. Each set of mass teeth 120 (e.g., the mass teeth 120 of each balancing mass 114), for example, is meshed with the common set of the shaft teeth 96. More particularly, each mass tooth 120 may project radially outward into a gap between a respective circumferentially neighboring pair of the shaft teeth 96. Similarly, each shaft tooth 96 may project radially inward into a gap between a respective circumferentially neighboring pair of the mass teeth 120 of each balancing mass 114. Each mass tooth tip 142 may also be pressed and biased (e.g., preloaded) radially against the powerplant rotating structure 70 and, more particularly, the receptacle outer side 100. During this mode of operation (e.g., an anchored mode) with the balancing device 76 and its balancing masses 114 in this condition (e.g., an anchored condition), the meshed mass teeth 120 and shaft teeth 96 rotationally anchor (e.g., fix) the balancing device 76 and its balancing masses 114 to the powerplant shaft 74. The balancing device 76 and its balancing masses 114 are thereby operable to rotate with the powerplant shaft 74 and maintain shaft balance, once set.

In some embodiments, referring to FIG. 2, each of the balancing masses 114 may be configured with a common weight. Each of the balancing masses 114 of FIG. 2, for example, is provided with a common configuration; e.g., an identical weight, geometry, etc. The present disclosure, however, is not limited to such exemplary embodiments. For example, in other embodiments, one or more of the balancing masses 114 may be provided with a different configuration than one or more other balancing masses 114. One or more of the balancing masses 114, for example, may each be heavier than another one or more of the balancing masses 114. In addition or alternatively, an eccentricity of one or more of the balancing masses 114 about the structure axis 72 may be different than another one or more of the balancing masses 114.

Figure 5:
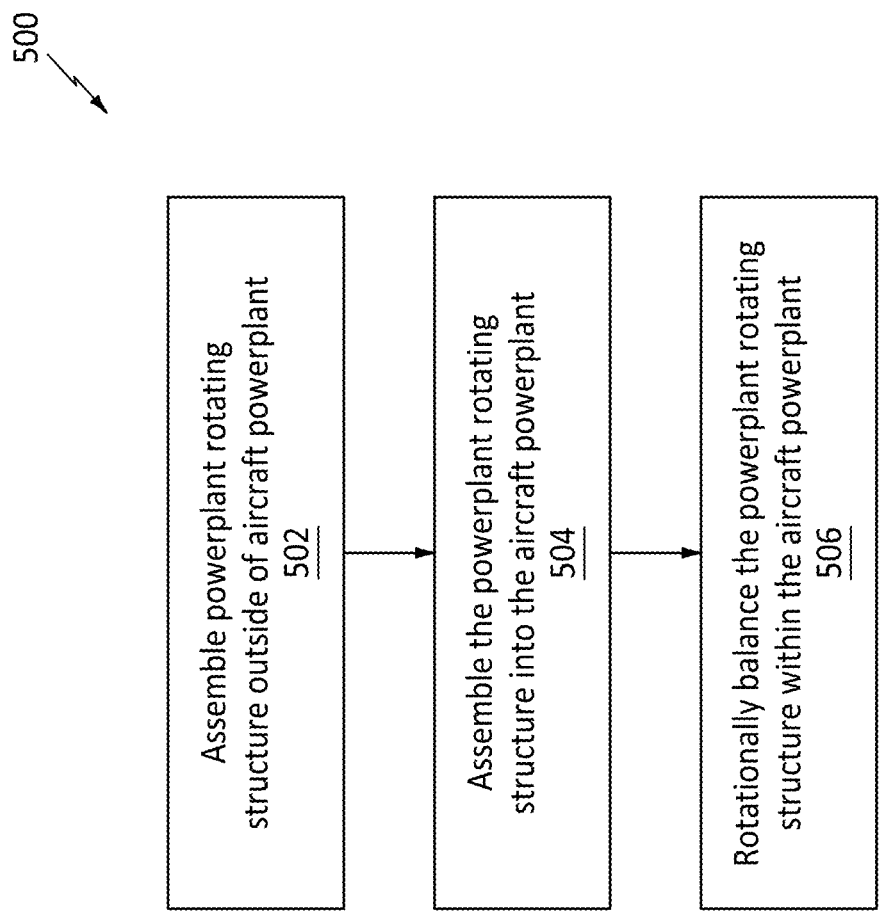
FIG. 5 is a flow diagram of a method for balancing a rotating structure of an aircraft powerplant.

FIG. 5 is a flow diagram of a method 500 for (e.g., in situ) balancing a rotating structure of an aircraft powerplant. For case of description, this balancing method 500 is described below with respect to the powerplant rotating structure 70 shown in FIGS. 2 and 3. The present disclosure, however, is not limited to such an exemplary powerplant rotating structure 70 nor to use of the exemplary balancing device 76 described herein.

In step 502, the powerplant rotating structure 70 is assembled outside of the aircraft powerplant 20 and its gas turbine engine 26. During this assembly, the powerplant rotating structure 70 may be rotationally balanced on a balancing rig using various known balancing techniques.

In step 504, the powerplant rotating structure 70 is assembled into the aircraft powerplant 20 and its gas turbine engine 26. The previously assembled and balanced powerplant rotating structure 70, for example, may be partially or completely disassembled and then reassembled into the aircraft powerplant 20 and its gas turbine engine 26. During this reassembly process, slight variations due to manufacturing tolerances, etc. may lead to a slight misbalance of the powerplant rotating structure 70.

Figure 6A:
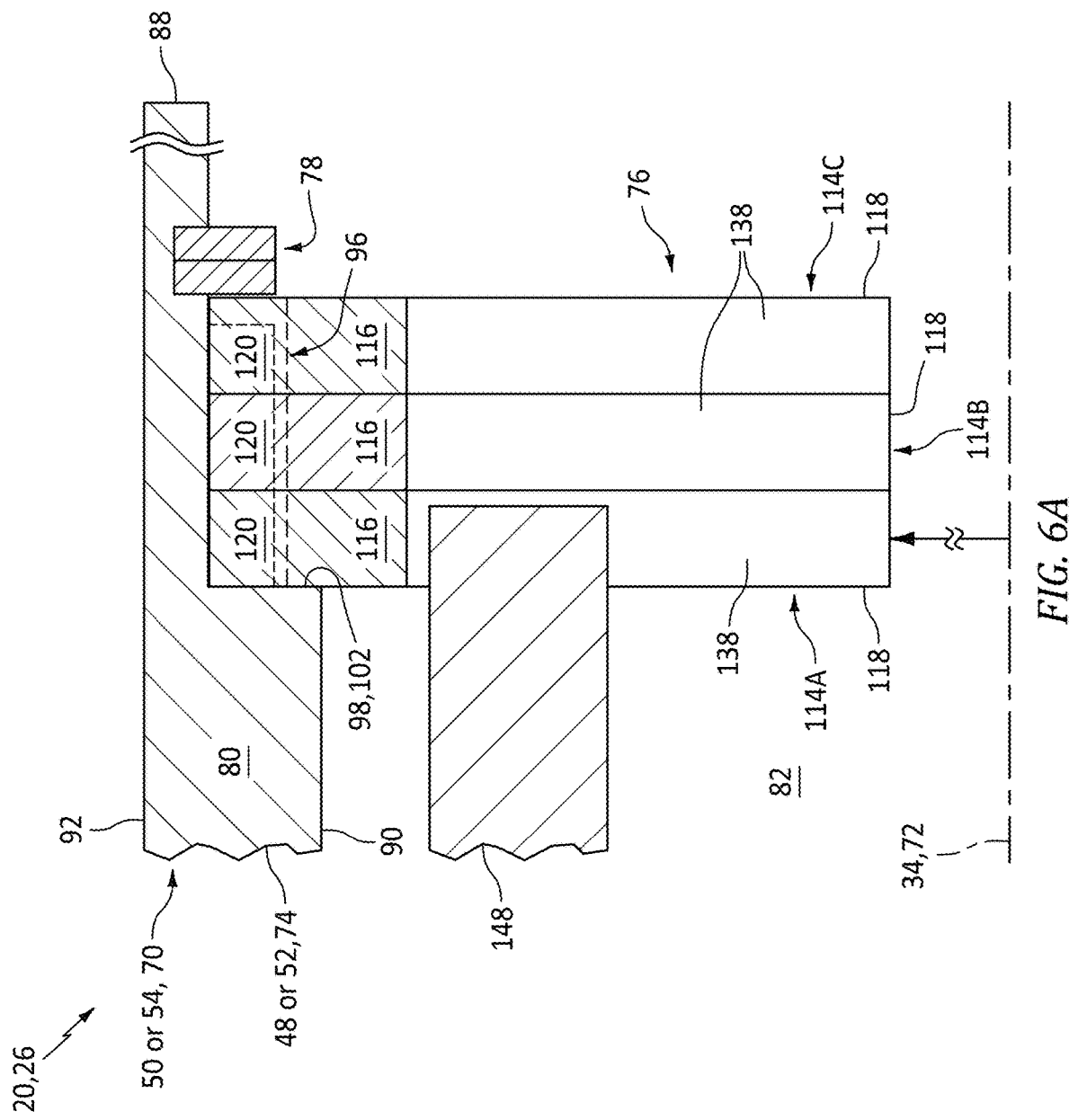
FIGS. 6A-C are illustrations of a balancing device during a balancing operation.
Figure 6B:
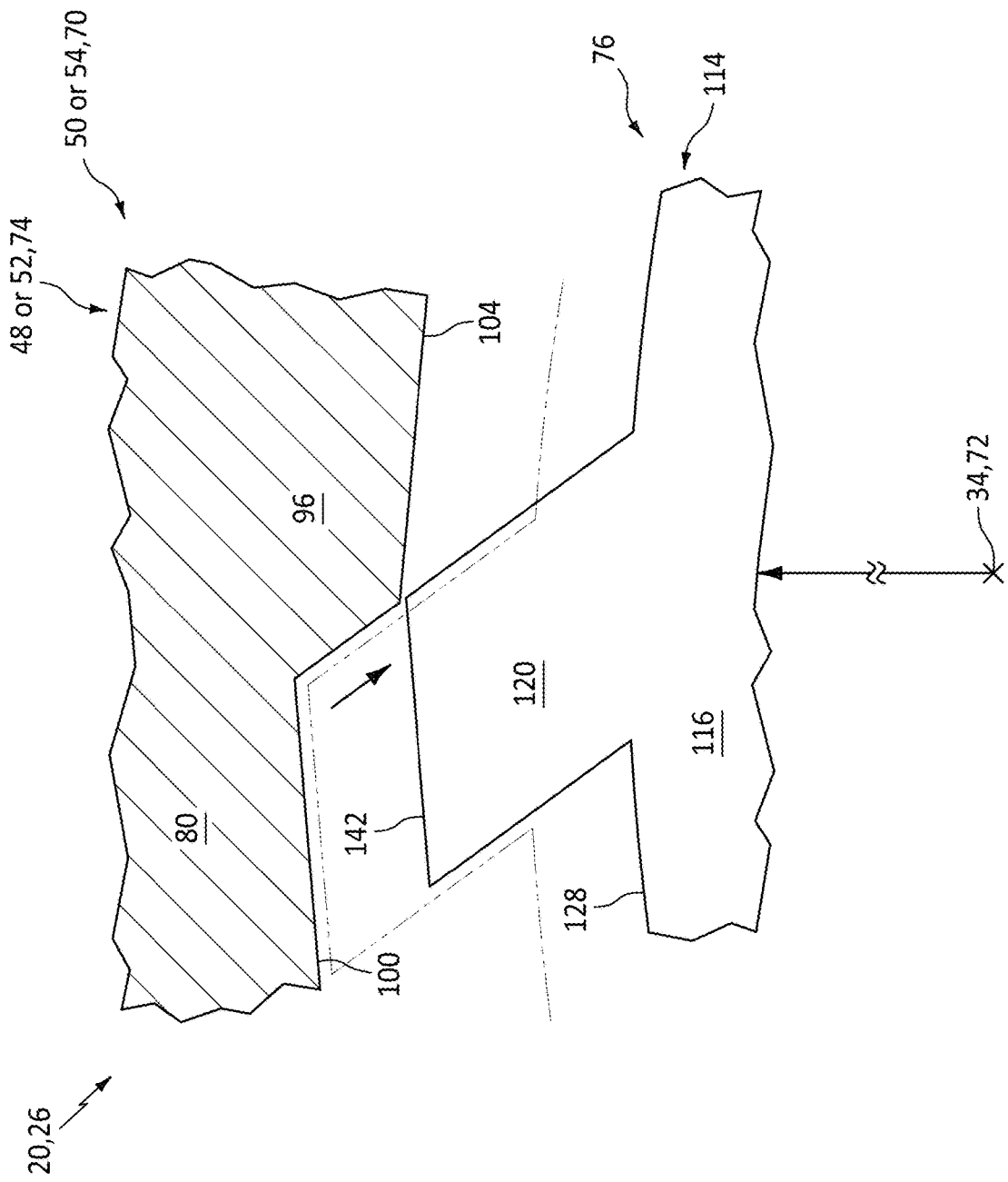
Figure 6C:
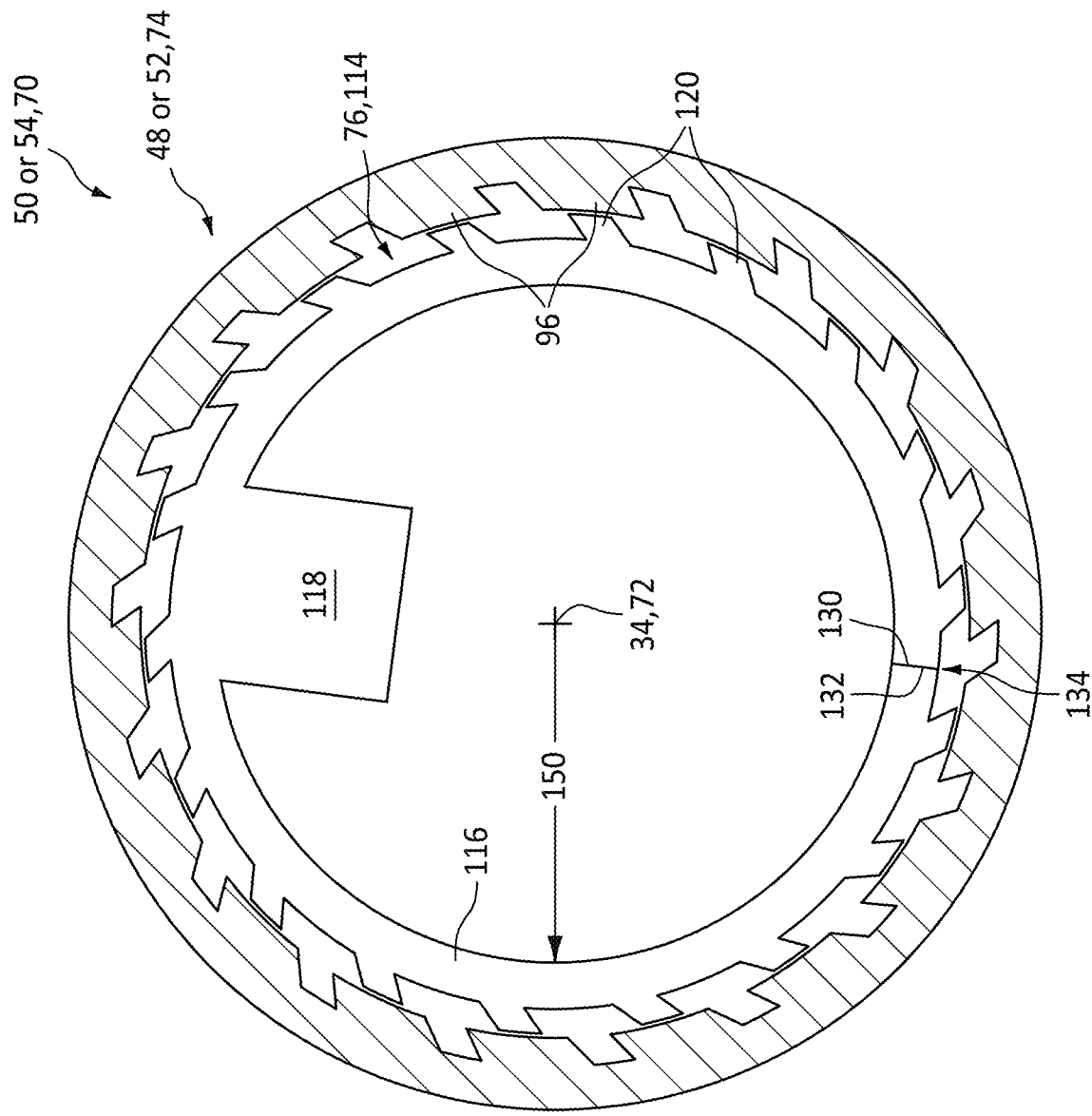

In step 506, the powerplant rotating structure 70 is rotationally balanced while partially or completely assembled within the aircraft powerplant 20 and its gas turbine engine 26. For example, referring to FIG. 6A, a tool 148 may be inserted into the shaft bore 82 and mated with a respective one of the balancing masses 114. The tool 148 in FIG. 6A, for example, may grip the mass weight 118 of the respective balancing mass 114; e.g., the first balancing mass 114A in FIG. 6A. While gripping the respective balancing mass 114, the tool 148 may be maneuvered (e.g., turned around the structure axis 72) to rotate the respective balancing mass 114 about the structure axis 72. Referring to FIG. 6B, as a torque is applied to the respective balancing mass 114 by the tool 148 during another mode of operation (e.g., an adjustment mode), the mass teeth 120 are pressed against the shaft teeth 96. Each mass tooth 120 may slide radially inward along a respective one of the shaft teeth 96 so as to disengage (e.g., un-mesh) the mass teeth 120 from the shaft teeth 96. Referring to FIG. 6C, this movement in turn pinches the mass ends 130 and 132 together through elastic deformation and effectively temporarily decreases a radius 150 of the respective balancing mass 114 when the respective balancing mass 114 is in an adjustment condition. The respective balancing mass 114 may thereby be rotated about the structure axis 72 relative to the powerplant shaft 74. Using this technique with a single one of the balancing masses 114, some of the balancing masses 114 or all of the balancing masses 114, a technician may rotationally balance the powerplant rotating structure 70 from outside of a stationary structure (e.g., see 151 in FIG. 1) while the powerplant rotating structure 70 remains installed within the aircraft powerplant 20 and its gas turbine engine 26. By contrast, using traditional balancing techniques, the powerplant rotating structure 70 would need to be removed from the aircraft powerplant 20 and rebalanced on the balancing rig.

The step 506 above generally describes the tool 148 as being used to rotate the respective balancing mass 114 about the structure axis 72 as the powerplant rotating structure 70 is held stationary. However, in other embodiments, it is contemplated the tool 148 may be used to hold the balancing mass 114 stationary while the powerplant rotating structure 70 is (e.g., manually) rotated about the structure axis 72. In still other embodiments, it is contemplated the balancing mass 114 and the powerplant rotating structure 70 may be rotated in opposite directions about the structure axis 72.

Figure 7:
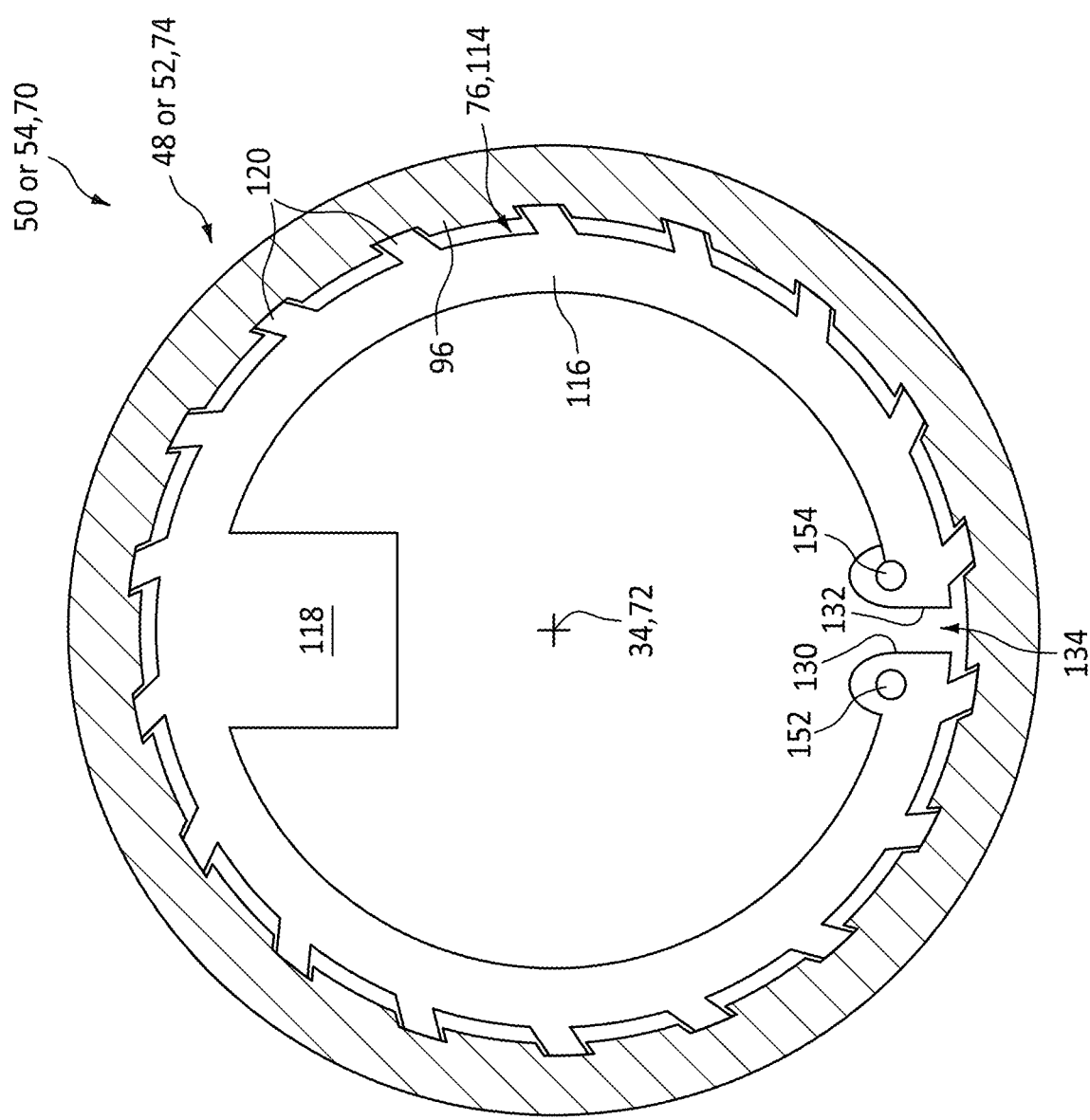
FIG. 7 is a cross-sectional illustration of the powerplant rotating structure with another grip feature.

In some embodiments, the mass weight 118 may be used as a gripping feature to be engaged by the tool 148. In other embodiments, referring to FIG. 7, each mass ring 116 may be configured with eyes 152 and 154 at its mass ends 130 and 132. Each of these eyes 152 and 154 may receive a respective post of a split ring plier tool. This tool may then squeeze the mass ends 130 and 132 together to facilitate the disengagement between the mass teeth 120 and the shaft teeth 96.

Figure 8:
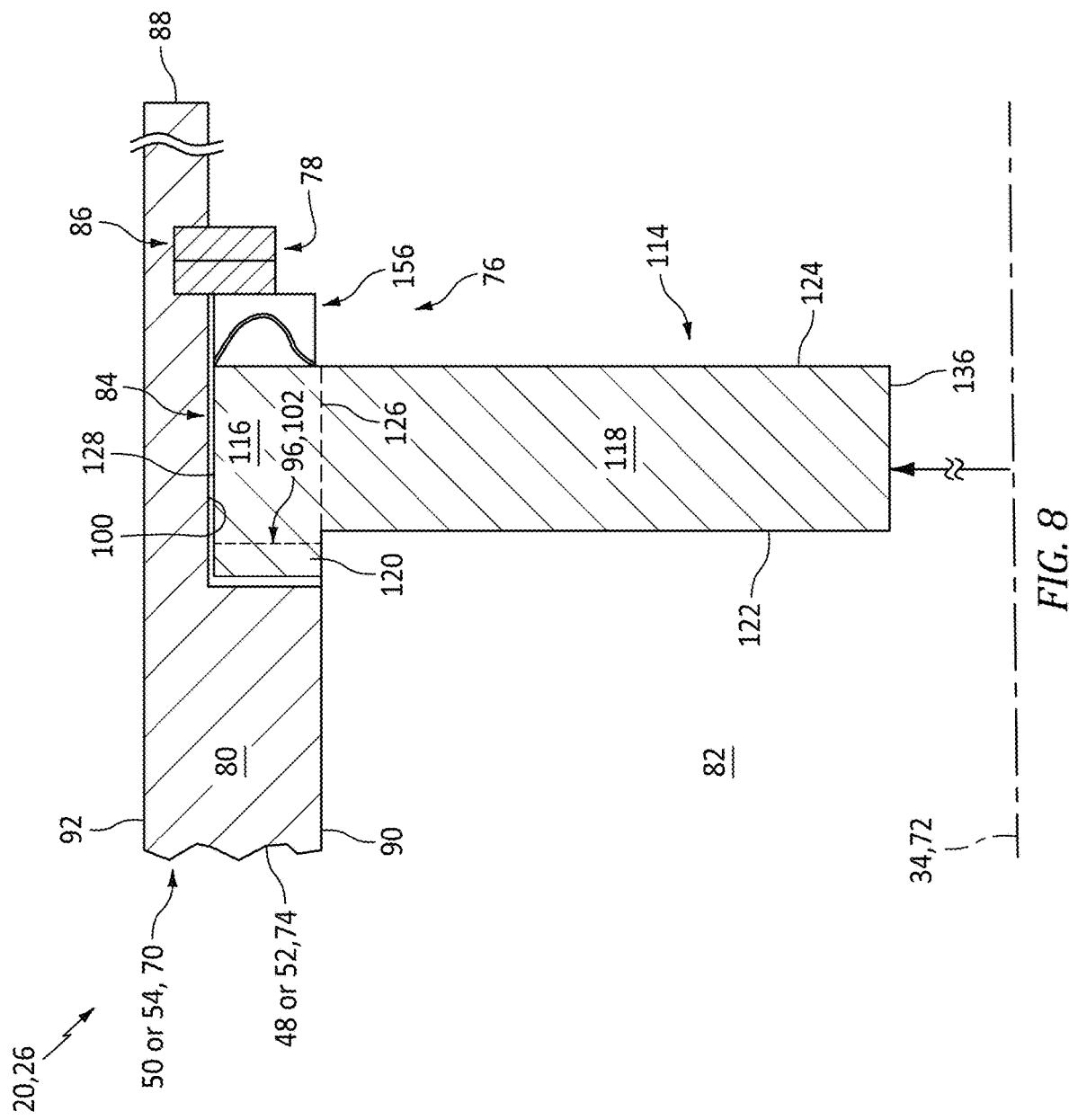
FIG. 8 is a partial sectional illustration of the powerplant rotating structure with an axial meshed interface arrangement.
Figure 10:
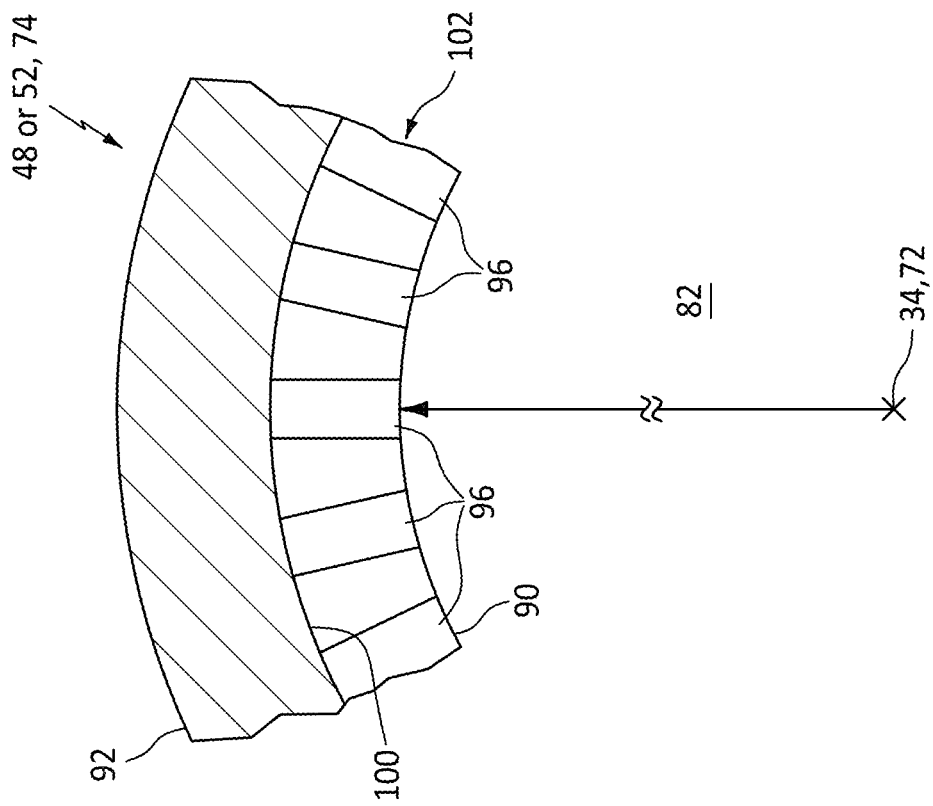
FIG. 10 is a partial cross-sectional illustration of a powerplant shaft for the powerplant rotating structure of FIG. 8.
Figure 9:
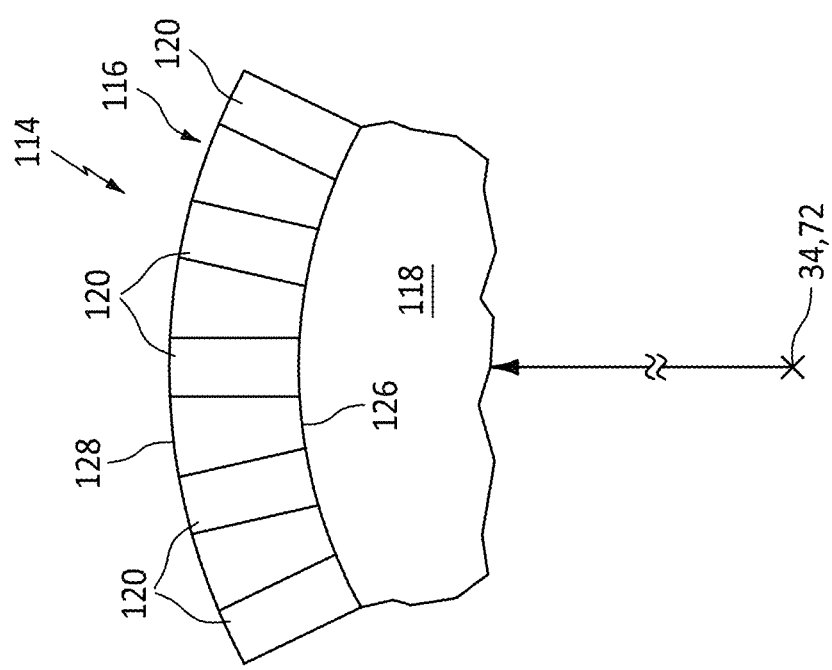
FIG. 9 is a partial end view illustration of a balancing mass for the powerplant rotating structure of FIG. 8.
Figure 11:
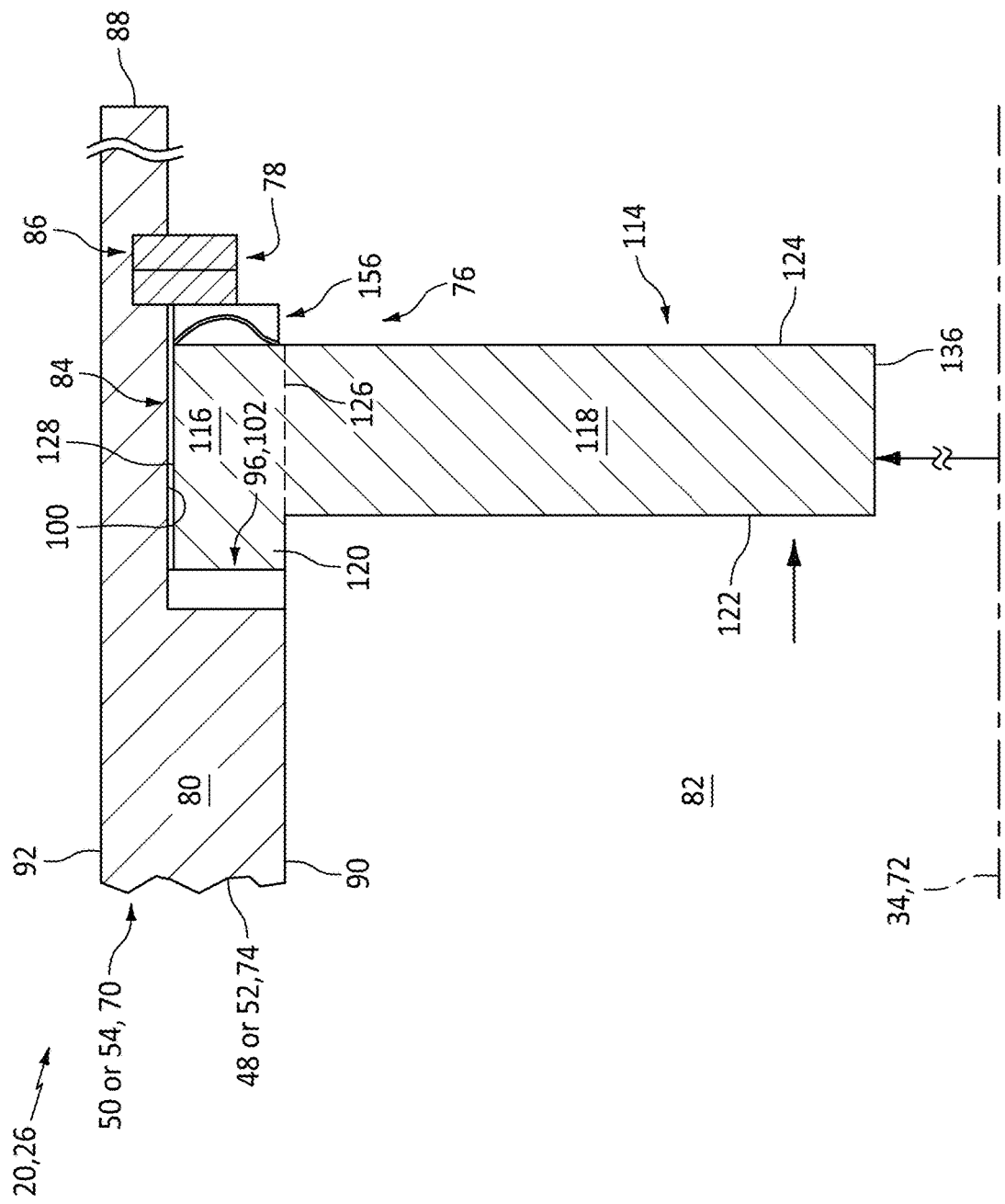
FIG. 11 is an illustration of the balancing mass of FIG. 8 during a balancing operation.

In some embodiments, each of the balancing masses 114 may be configured as a spring element to facilitate its elastic deformation as described above. In other embodiments, referring to FIG. 8, the balancing device 76 may alternatively be configured with a discrete spring element 156. This spring element 156 is disposed axially between and is axially engaged with the balancing mass 114 and the retainer 78. Here, the mass teeth 120 are arranged to the mass first side 122. Each mass tooth 120, for example, extends radially from the ring inner side 126 to the ring outer side 128; see also FIG. 9. Similarly, the shaft teeth 96 are arranged at (e.g., integrated into) the shaft shoulder 102. Each shaft tooth 96, for example, extends radially from the receptacle outer side 100 to the shaft inner side 90; see also FIG. 10. The balancing mass 114 of FIG. 8 thereby engages the powerplant shaft 74 through a respective axial meshed interface. With this arrangement, the tool may grip the mass weight 118 (or another portion or portions of the balancing mass 114). Referring to FIG. 11, the tool may then axially push the balancing mass 114 towards the retainer 78 (or alternatively pull the balancing mass 114 towards the retainer 78 with the tool to another side of the balancing mass 114) to axially compress (e.g., elastically deform) the spring element 156 until the mass teeth 120 are no longer meshed with the shaft teeth 96. The balancing mass 114 may then be rotated about the structure axis 72 relative to the powerplant shaft 74. A technician may thereby rotationally balance the powerplant rotating structure 70 from outside of the stationary structure (e.g., see 151 in FIG. 1) while the powerplant rotating structure 70 remains installed within the aircraft powerplant 20 and its gas turbine engine 26.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft powerplant, comprising:
 a rotating structure configured to rotate about an axis, the rotating structure including a shaft, a retainer, a balancing device and a bladed rotor connected to the shaft;
 the shaft including a bore and a shoulder axially along the bore;
 the retainer disposed in the bore and mounted to the shaft; and
 the balancing device configured to rotationally balance the rotating structure about the axis, the balancing device disposed in the bore and axially retained between the shoulder and the retainer, and the balancing device comprising a balancing mass with a plurality of mass teeth arranged circumferentially about the axis;
 wherein, during a first condition, the balancing mass is rotationally repositionable about the axis relative to the shaft while the balancing device remains in the bore and axially retained between the shoulder and the retainer; and
 wherein, during a second condition, the plurality of mass teeth are meshed with a plurality of shaft teeth of the shaft to rotationally fix the balancing mass to the shaft.

2. The apparatus of claim 1, wherein the balancing mass further includes a mass ring extending circumferentially about the axis, and each of the plurality of mass teeth is connected to and projects out from the mass ring.

3. The apparatus of claim 2, wherein the balancing mass further includes a mass weight connected to the mass ring, and the mass weight projects radially inward from the mass ring.

4. The apparatus of claim 2, wherein the plurality of mass teeth project out from the mass ring in a radial outward direction away from the axis.

5. The apparatus of claim 2, wherein the plurality of mass teeth project out from the mass ring in an axial direction along the axis.

6. The apparatus of claim 2, wherein the mass ring extends circumferentially about the axis between opposing circumferential ends of the mass ring, and the mass ring includes a slot formed by and circumferentially between the opposing circumferential ends of the mass ring.

7. The apparatus of claim 2, wherein the mass ring has a full-hoop geometry around the axis.

8. The apparatus of claim 1, wherein the balancing mass is elastically deformable between a first configuration and a second configuration such that that a radius of the balancing mass in the first configuration is smaller than the radius of the balancing mass in the second configuration, the balancing mass is in the first configuration during the first condition, and the balancing mass is in the second configuration during the second condition.

9. The apparatus of claim 8, wherein the balancing mass axially engages the retainer.

10. The apparatus of claim 1, wherein the balancing mass is a first balancing mass, and the balancing device further includes a second balancing mass axially engaged with the first balancing mass.

11. The apparatus of claim 10, wherein the balancing device further includes a third balancing mass axially engaged with the first balancing mass, and the first balancing mass is axially between the second balancing mass and the third balancing mass.

12. The apparatus of claim 1, wherein the balancing device further includes a spring element axially between the balancing mass and the retainer.

13. The apparatus of claim 12, wherein the spring element is axially engaged with the balancing mass and the retainer.

14. The apparatus of claim 12, wherein the spring element is elastically deformable between a first configuration and a second configuration such that an axial thickness of the spring element in the first configuration is smaller than the axial thickness of the spring element in the second configuration, the spring element is in the first configuration during the first condition, and the spring element is in the second configuration during the second condition.

15. The apparatus of claim 1, further comprising a compressor section, a combustor section, a turbine section and a flowpath extending through the compressor section, the combustor section and the turbine section, wherein the bladed rotor is disposed in the turbine section or the compressor section.

16. An apparatus for an aircraft powerplant, comprising:
 a rotating structure configured to rotate about an axis, the rotating structure including a shaft, a retainer, a balancing device and a bladed rotor connected to the shaft;
 the shaft including a bore, a plurality of shaft teeth and a shoulder axially along the bore;
 the retainer disposed in the bore and mounted to the shaft;
 the balancing device configured to rotationally balance the rotating structure about the axis, the balancing device disposed in the bore and axially retained between the shoulder and the retainer, and the balancing device comprising a balancing mass; and the balancing mass including a mass ring, a mass weight and a plurality of mass teeth, the mass ring extending circumferentially about the axis between opposing circumferential ends of the balancing mass, the mass weight projecting radially inward from the mass ring, the plurality of mass teeth arranged circumferentially about the axis and projecting radially out from the mass ring, and the plurality of mass teeth meshed with the plurality of shaft teeth.

17. The apparatus of claim 16, wherein the balancing mass is rotationally repositionable about the axis relative to the shaft while the balancing device remains in the bore and axially retained between the shoulder and the retainer.

18. The apparatus of claim 16, wherein
the balancing mass is a first balancing mass, and the balancing device further includes a second balancing mass;
the second balancing mass includes a second mass ring, a second mass weight and a plurality of second mass teeth;
the second mass ring extends circumferentially about the axis between opposing circumferential ends of the second balancing mass;
the second mass weight projects radially inward from the second mass ring; and
the plurality of second mass teeth are arranged circumferentially about the axis and project radially out from the second mass ring, and the plurality of second mass teeth are meshed with the plurality of shaft teeth.

19. The apparatus of claim 18, wherein
the balancing device further includes a third balancing mass, and the first balancing mass, the second balancing mass and the third balancing are arranged in a stack axially between the shoulder and the retainer;
the third balancing mass includes a third mass ring, a third mass weight and a plurality of third mass teeth;
the third mass ring extends circumferentially about the axis between opposing circumferential ends of the third balancing mass;
the third mass weight projects radially inward from the third mass ring; and
the plurality of third mass teeth are arranged circumferentially about the axis and project radially out from the third mass ring, and the plurality of third mass teeth are meshed with the plurality of shaft teeth.

20. An apparatus for an aircraft powerplant, comprising:
a rotating structure configured to rotate about an axis, the rotating structure including a shaft, a retainer, a balancing device and a bladed rotor connected to the shaft;
the shaft including a bore and a shoulder with a plurality of shaft teeth;
the retainer disposed in the bore and mounted to the shaft;
the balancing device configured to rotationally balance the rotating structure about the axis, the balancing device disposed in the bore and axially retained between the shoulder and the retainer, and the balancing device comprising a balancing mass and a spring element that is located axially between and engaged with the balancing mass and the retainer; and
the balancing mass including a mass ring, a mass weight and a plurality of mass teeth, the mass ring extending circumferentially around the axis, the mass weight projecting radially inward from the mass ring, the plurality of mass teeth arranged circumferentially about the axis and projecting axially out from the mass ring, and the plurality of mass teeth meshed with the plurality of shaft teeth.

* * * * *